UNITED STATES PATENT OFFICE.

THOMAS ØYE, OF CHRISTIANIA, NORWAY.

TREATMENT OF VULCANIZED FIBERS.

1,234,377.  Specification of Letters Patent.  Patented July 24, 1917.

No Drawing.  Application filed November 21, 1916.  Serial No. 132,511.

*To all whom it may concern:*

Be it known that I, THOMAS ØYE, a subject of the King of Norway, and residing at Storgaten 28, Christiania, Norway, have invented certain new and useful Improvements in and Relating to the Treatment of Vulcanized Fibers, of which the following is a specification.

The present invention relates to the treatment of vulcanized fiber and its object is to render the hard plates of vulcanized fiber flexible and supple so that they may be employed as soles for all kinds of footwear, and for numerous and varied other purposes.

The invention consists in treating the hard plates of vulcanized fiber with a solution of zinc chlorid in water and impregnating the fiber with oil.

Preferably after the plates are impregnated with oil they are treated so as to prevent the oil exuding from the fiber.

The following particulars are given by way of example to illustrate a suitable method of carrying the invention into effect:—

Plates of hard vulcanized fiber of a thickness of from 1 m. m. to about 6 m. m. are exposed in a vessel of suitable size to the action of a solution of zinc chlorid in water. The plates are then completely dried in air, and thereupon impregnated with a mixture of water and an oil so treated that it is capable of being mixed with water to form an emulsion (such as, for instance, sulfonated castor oil or Turkey red-oil) at a low, steady temperature, and are subsequently impregnated, also at a low temperature, with an animal or vegetable oil.

After the oil adhering to the surface of the plates has been carefully removed, the latter are placed in a bath of melted paraffin, in which they remain for some time. When the plates are taken out of this bath, the paraffin adhering to the surface of the plates is carefully removed, so that it becomes even and smooth.

Instead of dipping the plates into the melted paraffin, they may be dipped in a solution of water and water-glass.

After the plates have been treated in this manner they become so flexible and supple that they can be sewn or fixed with sprigs, rivets, pins, or plugs, and thus they are capable of being used as sole leather for footwear of every description, and may be put to numerous other uses in the mechanical and electrical arts.

Having now described my invention, what I claim as new and desire to secure by Letters Patent is:—

1. The method of rendering plates of hard vulcanized fiber flexible and supple which comprises treating the plates with a solution of zinc chlorid in water, impregnating the plates with a mixture of water and oils treated so as to be miscible therewith and form emulsions, and impregnating the plates with a fatty oil.

2. The method of rendering plates of hard vulcanized fiber flexible and supple which comprises treating the plates with a solution of zinc chlorid, and impregnating the plates with a fatty oil.

3. The method of rendering plates of hard vulcanized fiber flexible and supple which comprises treating the plates with a solution of zinc chlorid, impregnating the plates with a fatty oil and treating the plates with a material adapted to limit the exudation of the oil.

4. The method of rendering plates of hard vulcanized fiber flexible and supple which comprises, treating the plates with a solution of zinc chlorid, impregnating the plates with a mixture of water and oil treated so as to be miscible therewith and form an emulsion, impregnating the plates with a fatty oil and treating the plates in a bath of melted paraffin.

In testimony whereof I have signed my name to this specification.

THOMAS ØYE.